Nov. 11, 1924.
F. G. ERNST
1,514,840
METHOD OF MANUFACTURING PIANOS
Filed Dec. 17, 1920     8 Sheets-Sheet 2
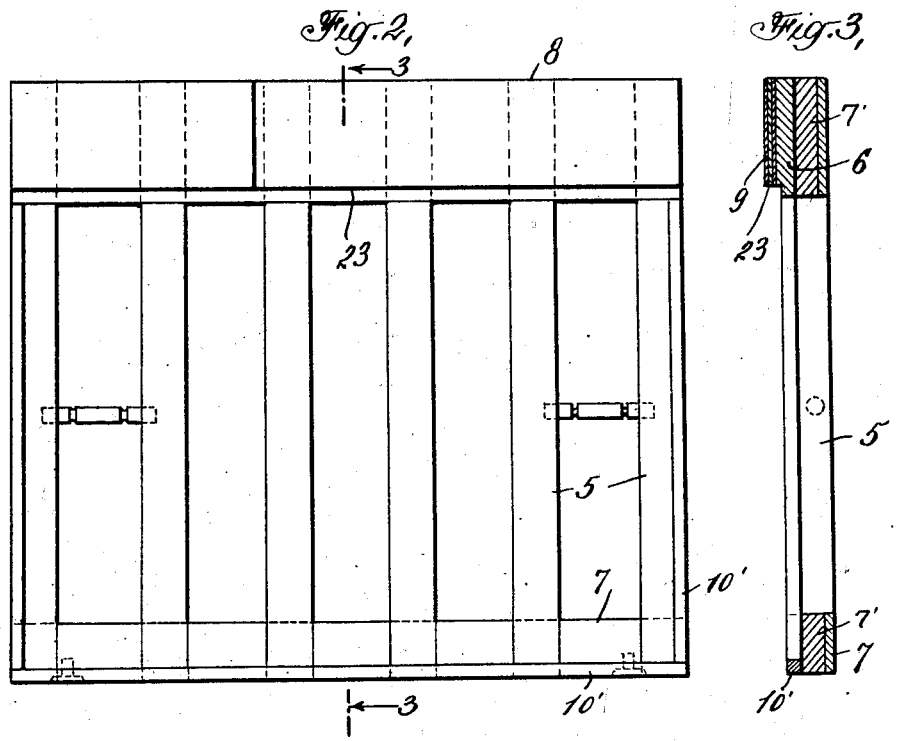
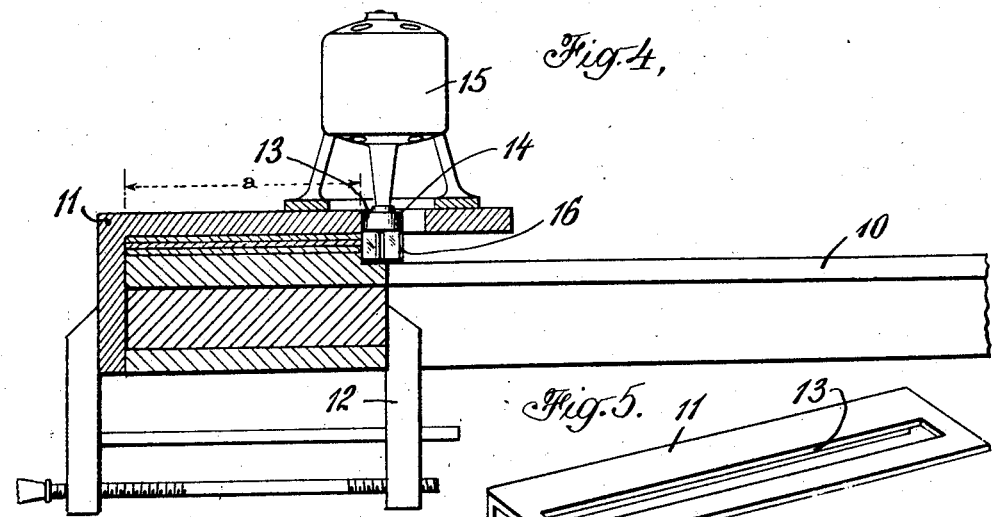
Frank G. Ernst, Inventor
By his Attorneys
Pennie Davis Marvin & Edmonds Nov. 11, 1924.
F. G. ERNST
1,514,840
METHOD OF MANUFACTURING PIANOS
Filed Dec. 17, 1920
8 Sheets-Sheet 3
Fig. 6,
Fig. 7,
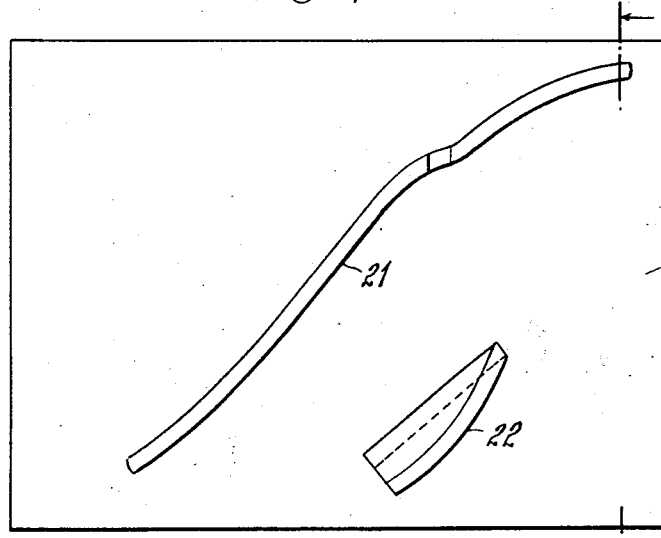
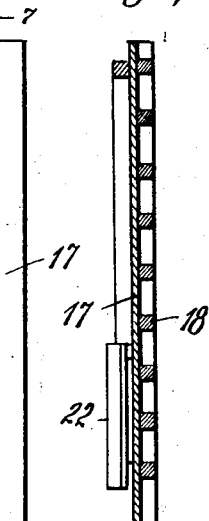
Fig. 8,
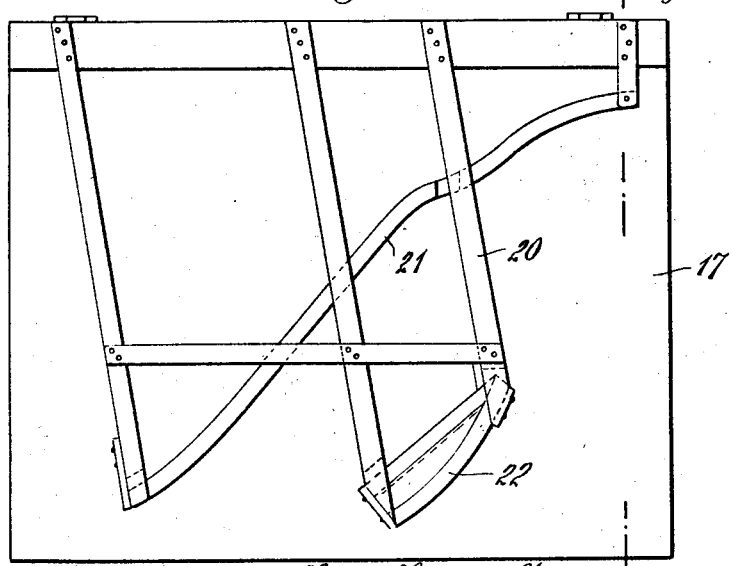
Fig. 9,
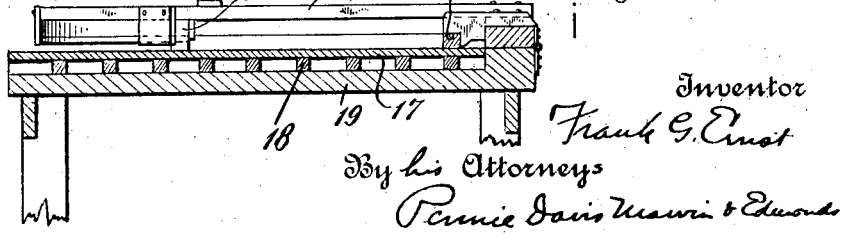
Inventor
Frank G. Ernst
By his Attorneys
Pennie Davis Marvin & Edmonds Nov. 11, 1924.
F. G. ERNST
1,514,840
METHOD OF MANUFACTURING PIANOS
Filed Dec. 17, 1920    8 Sheets-Sheet 4
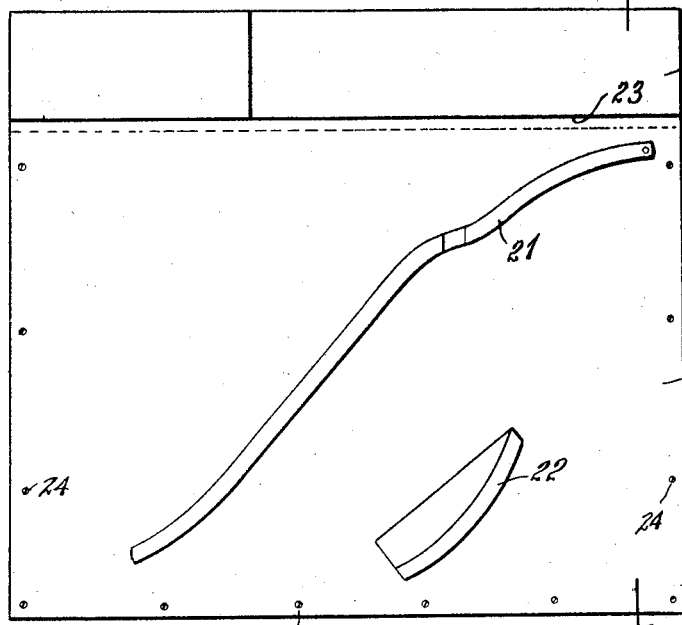
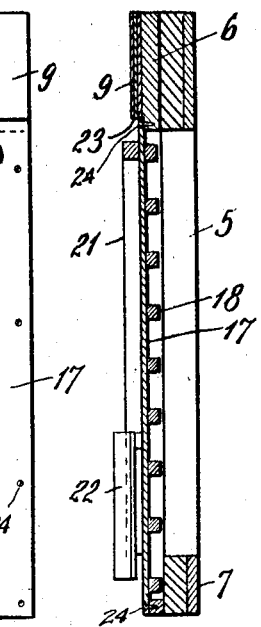
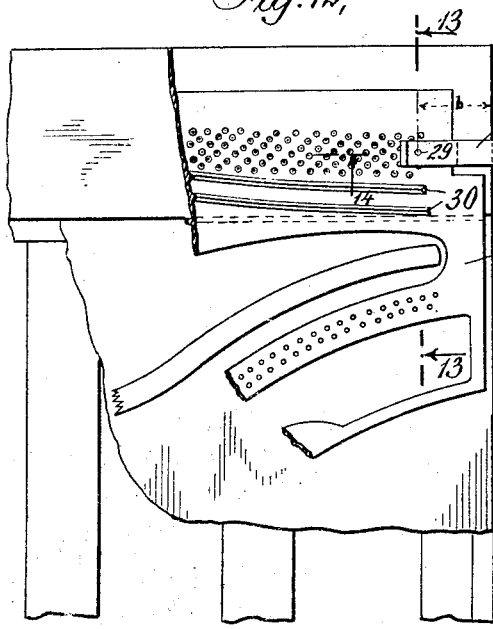
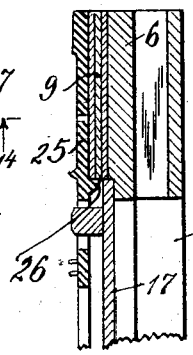
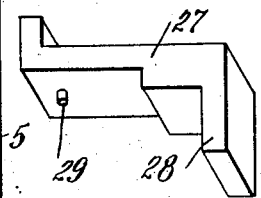
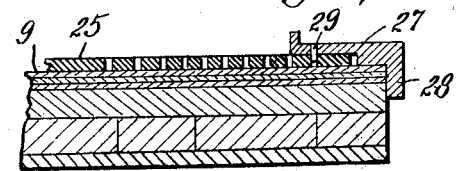
Inventor
Frank G. Ernst
By his Attorneys
Pennie Davis Marvin & Edmonds Nov. 11, 1924.  
F. G. ERNST  
1,514,840  
METHOD OF MANUFACTURING PIANOS  
Filed Dec. 17, 1920  
8 Sheets-Sheet 5
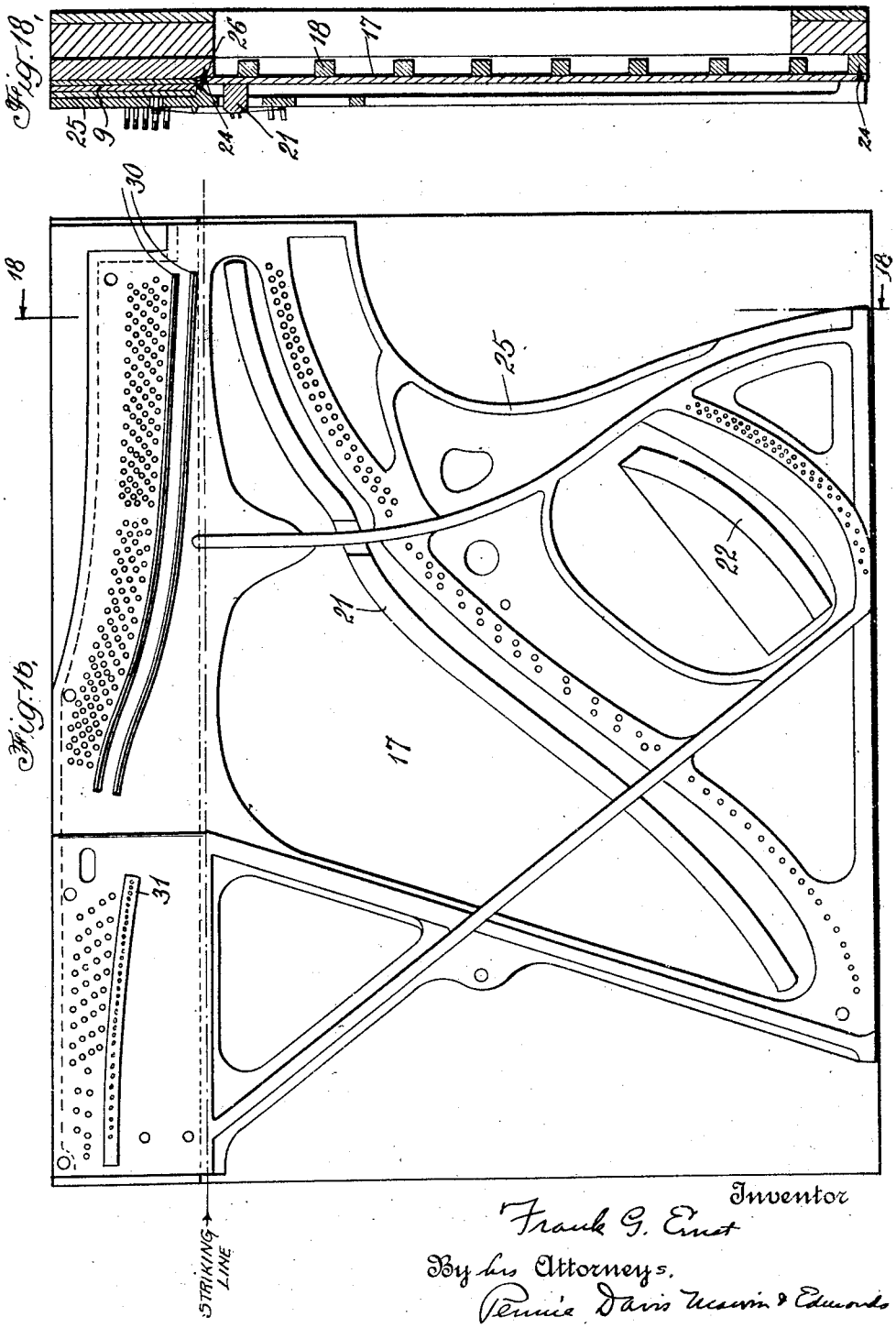

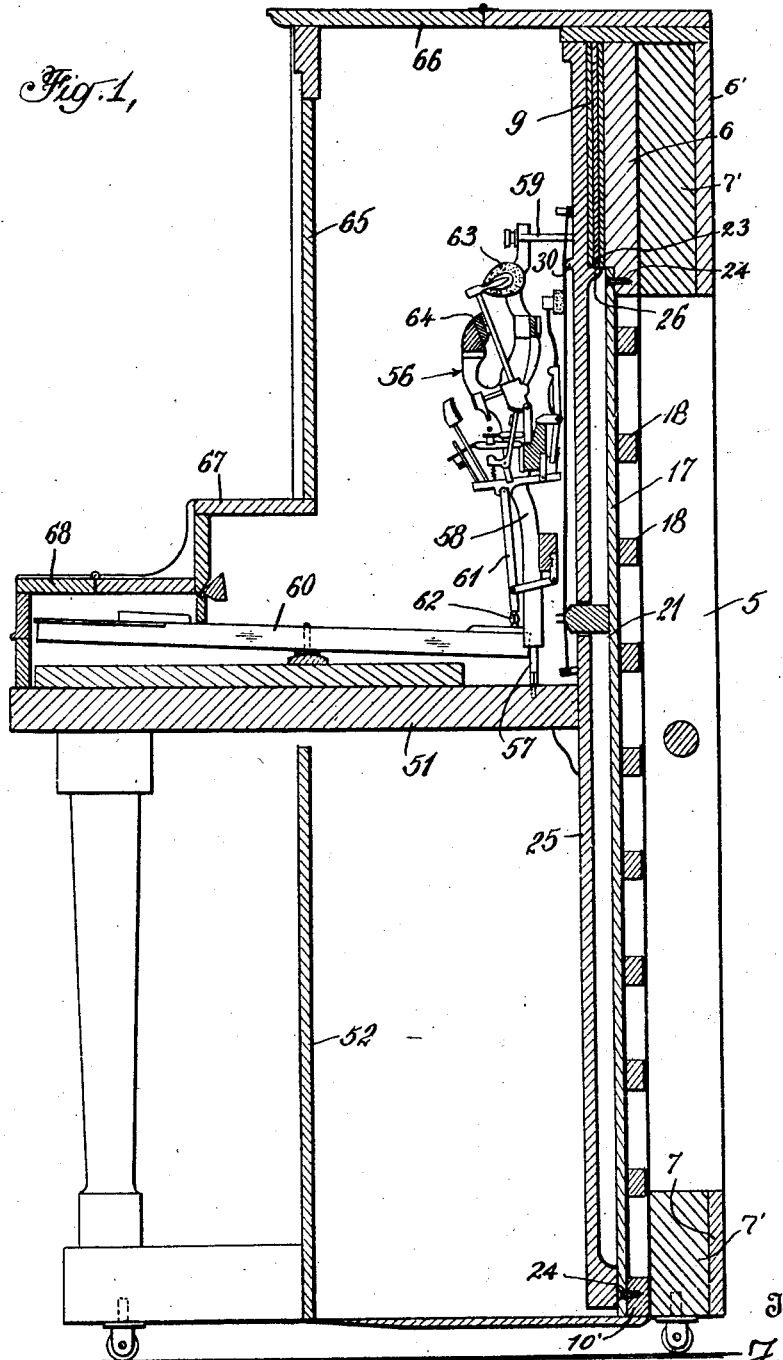

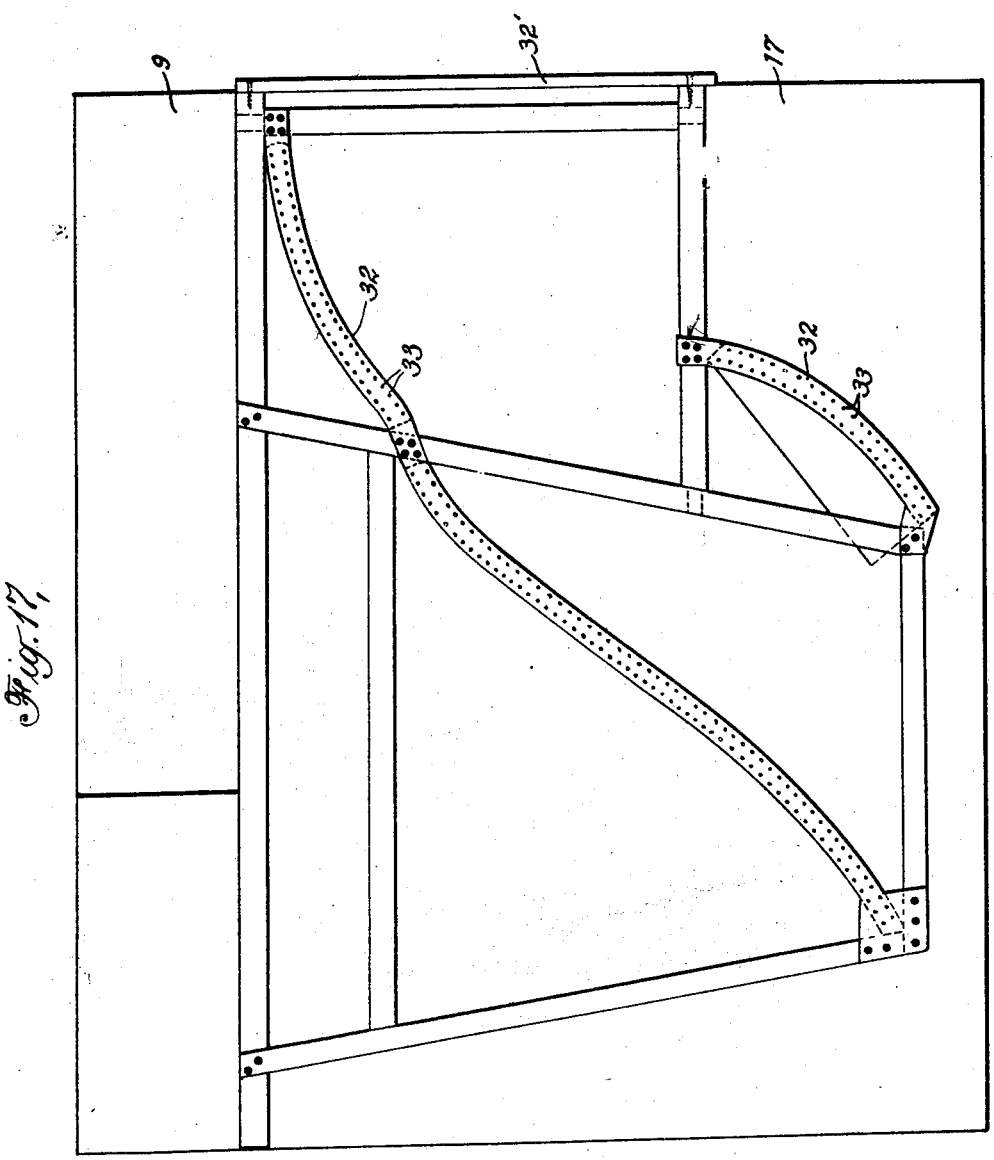

BEST AVAILABLE COPY
Nov. 11, 1924. 1,514,840
F. G. ERNST
METHOD OF MANUFACTURING PIANOS
Filed Dec. 17, 1920 8 Sheets-Sheet 7
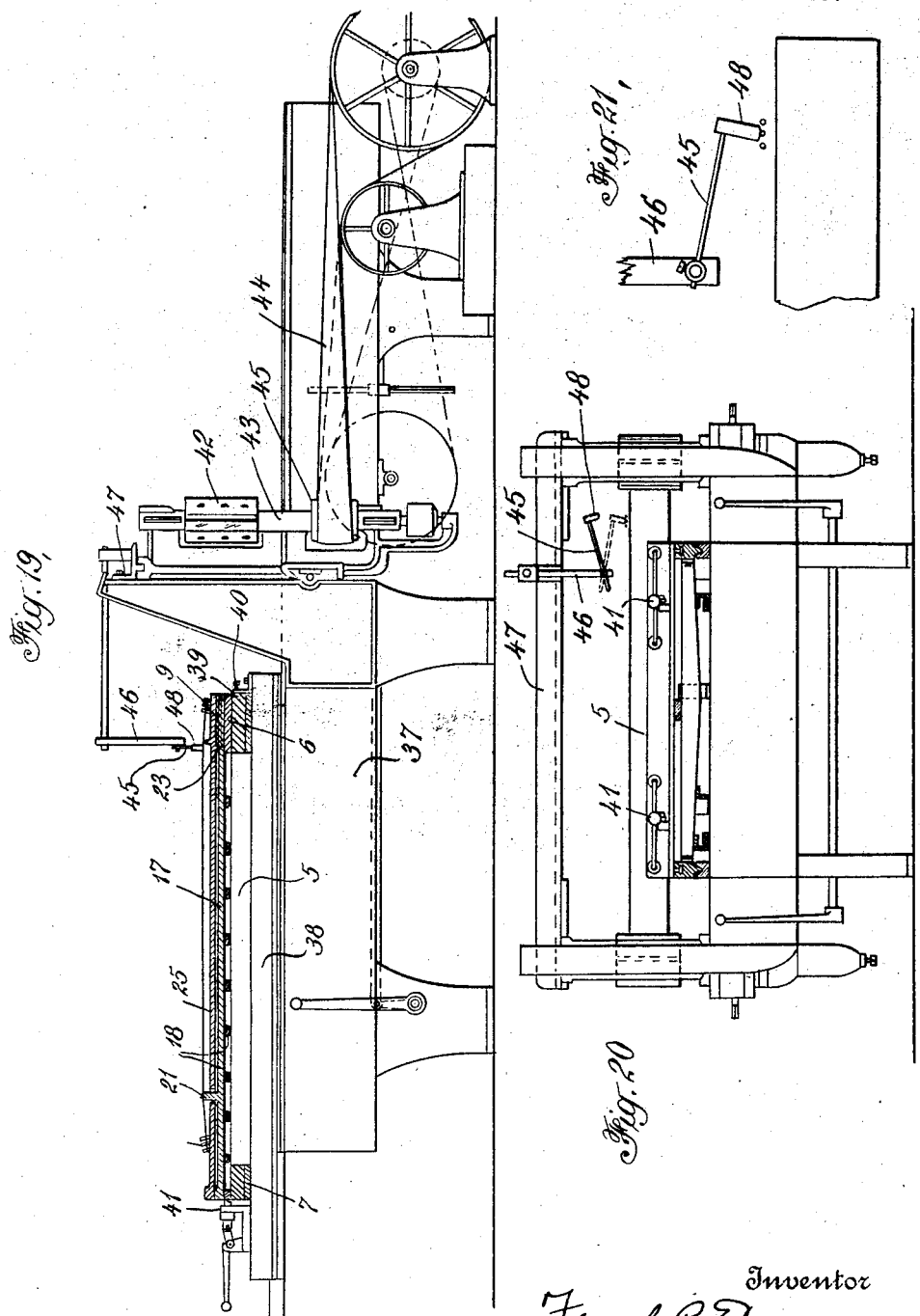

Nov. 11, 1924.
F. G. ERNST
1,514,840
METHOD OF MANUFACTURING PIANOS
Filed Dec. 17, 1920   8 Sheets-Sheet 8
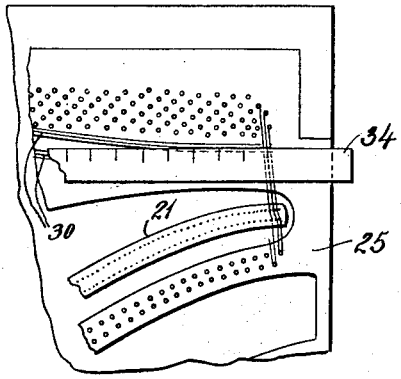
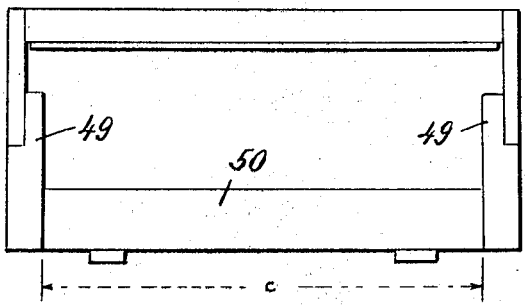
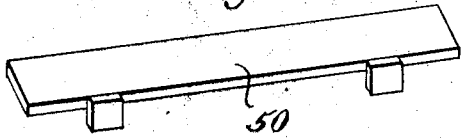
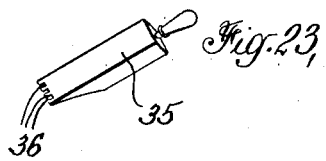
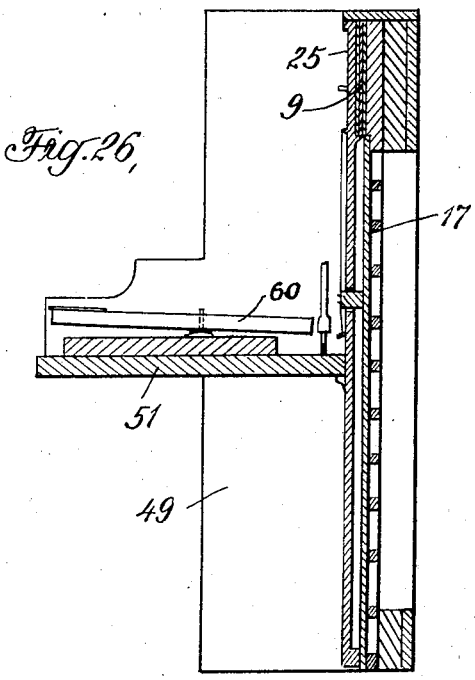
Inventor
Frank G. Ernst
By his Attorneys
Pennie Davis Marvin & Edmonds Patented Nov. 11, 1924.

UNITED STATES PATENT OFFICE.

1,514,840

FRANK G. ERNST, OF NEW YORK, N. Y., ASSIGNOR TO DEAN S. EDMONDS, OF NEW YORK, N. Y.

METHOD OF MANUFACTURING PIANOS.

Application filed December 17, 1920. Serial No. 431,349.

*To all whom it may concern:*

Be it known that I, FRANK G. ERNST, a citizen of the United States, residing at New York city, in the county of New York, State of New York, have invented certain new and useful Improvements in Methods of Manufacturing Pianos; and I do hereby declare the following to be a full, clear, and exact description of the invention, such as will enable others skilled in the art to which it appertains to make and use the same.

This invention relates to improvements in the art of manufacturing pianos and involves a substantial departure from the universal practice in that art.

Although the modern piano was brought to a high state of musical perfection many years ago through a series of succeeding inventions and improvements in the structure and mechanism, no corresponding advance has been heretofore made in the method of construction used. In spite of the large scale production which has characterized this industry, the method universally employed is that of the craftsman, each piano being individually constructed without regard to exact dimensions or interchangeability of parts.

The method of manufacturing pianos as heretofore practiced, includes the building of a heavy back or frame of wood, which is roughly dimensioned, with the ends approximately parallel and perpendicular to the top. No attempt is made toward exactness in shape or size. A wrest plank or pin block is secured to the frame near the upper edge, the sounding board, with the wooden bridges thereon, is applied beneath the wrest plank and the metal string plate is fastened over the sounding board without exact determination of its position on the frame. The string bearings on the wooden bridges are set and the bridges are pinned and notched. The tuning pins are then driven, the piano is strung and the strings are spaced and chipped or given the first tuning. As will be understood, the strings bear no exact relation to the lateral edges of the frame, nor is their angular relation fixed with reference to the edge of the wrest plank, which is assumed to indicate the striking line of the hammers, or to the wooden bridges.

The lateral edges of the frame are then planed and grooved by means of hand-operated tools to produce a good gluing surface, and the sides of the piano are glued in place. Since no exact dimensions have been followed in the construction of the frame, the distance between the sides will vary in each piano. Consequently, all of the remaining parts of the case are cut over-size in the case plant, and each must be cut to fit between the sides of the particular case and fitted thereto. Thus the key bed, bottom frame, toe rail and bottom board are separately cut by the case builder to the required length and mounted, a tedious operation requiring a large amount of manual labor of a highly skilled character.

The piano is then ready to receive the action. The ball bolts, to support the action brackets, are set with the aid of a template gauged from the front of the key bed, and the action brackets are fastened to the frame by means of the top bracket bolts. The position of the brackets in each piano will differ, depending upon the position of the plate on the frame. The action, which is separately assembled, is mounted on the brackets, but, owing to the lack of any exact dimensioning of the frame or definite relation of the strings to the striking line or sides of the piano, the action never fits accurately. The dampers and hammers must, therefore, be carefully adjusted to register with the proper strings. This requires bending of the individual damper stems and hammer shanks with consequent distortion. At best, the hammers only approximate the true striking line of the strings. The keys are now laid on the key bed to determine their position, and, since no definte relation between the front of the key bed and the abstracts of the piano action has been maintained, the keys must be marked for drilling to receive the capstan screws. The keys are then removed and drilled and are replaced in the bed.

The piano is then sent to the fly finishing department to receive the key blocks, name rail, shelf, top frame, top and key rail. These are all cut oversize in the case plant and each must be cut and fitted to the individual piano. The exterior of the case is finished by rubbing and polishing, and after tone regulating and final tuning, the piano is ready for shipment.

As a result of the method of construction outlined above, the most carefully made pianos have been individual in tone and other qualities because of the unavoidable variations in structure which were introduced during manufacture. It has always been necessary, therefore, to select a piano with extreme care, many pianos of the best known makes being musically inferior and liable to rapid deterioration in tone.

Another disadvantageous result of the method heretofore pursued in constructing pianos, is the difficulty of repairing damaged instruments. Inasmuch as all of the parts of a piano are specially fitted, it is usually impossible to effect substantial repairs except in the factory where mechanics, skilled in piano construction, are available.

Still another disadvantage of the established method is the difficulty of detecting careless workmanship. No standard being fixed, the workman proceeds without check to introduce such variations as suit his convenience, expecting those who follow him to overcome any defects of construction which he may introduce.

Nevertheless, manufacturers have always clung to the idea that pianos could not be otherwise manufactured than by a method involving the cutting of case parts to fit around a roughly shaped back or frame, and the inevitable bending and twisting of the action parts to enable the hammers and dampers to register with the strings. That such a method is uneconomical because of the time required for manufacture and also leads to inferior quality of the instrument, is sufficiently apparent. No better method was known heretofore, and, since all manufacturers were confronted with the same lack of uniformity of their product, they have been content to sell their inferior pianos to those of less discriminating musical taste, depending upon the occasionally fine instruments produced to maintain their reputation with the more critical public.

The object of the present invention is to provide a method of manufacturing pianos whereby the production of instruments of more uniform quality is attained and the manufacturing operations are considerably expedited, a method, moreover, which obviates the necessity of adjusting the parts of the action to each individual piano and which reduces materially the labor and material cost of constructing pianos, while insuring the immediate detection of careless workmanship.

A further object of the invention is the provision of a method of manufacturing pianos wherein all parts are interchangeable and replaceable from stock, thus making it possible to satisfactorily repair a piano which has been damaged, without returning the instrument to the factory.

Contrary to the generally accepted idea that pianos must be individually constructed to insure musical value, the new method constituting this invention is based upon the proven fact that pianos may be successfully standardized and constructed to definite and predetermined dimensions, and, in fact, that pianos thus constructed are uniformly superior in workmanship and quality. The advantages of the novel method are indeed numerous and cumulative to the purchaser as well as the manufacturer. The latter is enabled to produce a better piano at a lower cost, while the former is assured that the piano, with reasonable care, will maintain its musical quality, since many of the causes of the deterioration heretofore experienced are eliminated by the employment of the new method.

In constructing a piano in accordance with the new method, the usual form of heavy frame or back is built of horizontal and upright members, care being taken that the upper edge is straight. To the face of the frame near the upper edge, a wrest plank or pin block, consisting of three or more plies, is glued with its upper edge flush with the upper edge of the frame. The lower edge of the pin block is then finished by means of a power driven milling machine or other suitable device over a jig or template, so that it is exactly parallel to and at a predetermined distance from the upper edge of the frame. The line thus fixed, indicates the hammer striking line, which is about one eighth of an inch below.

The sounding board is prepared with a straight upper edge and with the right hand edge perpendicular thereto. The left hand edge and the bottom edge are oversized about one fourth inch to allow for bellying. The sounding board is disposed in a gluing press provided with a template which determines the positions of the ribs on the back of the board with respect to the upper and right-hand edges thereof. The ribs are glued in the press and the board is removed to another press, which similarly determines the positions of the bass and treble wooden bridges which are glued to the face of the board, also in exact relation to the upper and right hand edges thereof with a jig or template. When the board is complete, it is secured to the lining on the frame with its upper edge abutting the lower edge of the pin block and its right edge flush with that of the frame. Throughout the construction of the back and sounding board, exact dimensions are followed.

The cast metal string plate is provided with a rib at its back, and this rib is machined to a straight edge at a predetermined distance from the top iron-base bridge on the face of the plate at the last bass note on the left hand side, and the iron bridge at the last treble note on the right hand side.

The plate is then laid upon the sounding board, with the machined edge abutting the lower edge of the pin block. A template is employed to fix the distance of the middle pin hole for the last treble note from the right hand side of the frame, so that the bridges on the plate occupy a definite relation to the striking line of the hammers and the wooden bridges on the sounding board. The plate is temporarily fastened to the frame, and the string bearings on the wooden bridges are determined with a gauge saw. The plate is then removed and the wooden bridges are planed to the string bearing height which is determined by the gauge saw. The bridge pins are driven at points indicated by a template which is adjusted with reference to the bottom edge of the wrest plank and the right hand side of the frame on the hammer line. The plate is then fastened to the frame in the position previously determined; the tuning pins are inserted and the frame is strung. The strings are spaced according to the scale stick and then chipped.

With the utmost care in construction, the lateral edges of the frame will not be exactly perpendicular to the upper edge, and, under the ordinary method of construction, the deviation of the lateral edges from the perpendicular results in the variation of the space between the sides of the piano. Moreover, the width of the frames as heretofore constructed differs in each piano. These conditions require special fitting of the remaining parts of the piano. To prevent variations of this character, the frame, after the strings are applied, is mounted in a planer, hereinafter briefly described, and provided with a gauge to fix the position of the frame thereon. The gauge preferably consists of a dummy hammer, which is adapted to register with the middle string of the last note in the treble scale on the hammer line which is one eighth inch below the iron bridge on this string. When the hammer registers, the frame is clamped with its upper edge against a straight edge provided on the planer bed. Power is applied to the planer, which is provided with rotating knives. As the bed advances, the lateral edges of the frame and sounding board are planed parallel to gauge measurements and to a predetermined measurement between the right hand side and the last treble note on the hammer line, and brought to exact perpendicularity with respect to the upper edge or top of the frame. Upon its return, the bed travels twice as rapidly as during the advance, and the edges are automatically grooved by the rotating knives, being thus provided with grooves which furnish a good gluing surface, because the knives rotate in the same direction as that of the return travel of the planer bed.

The frame is removed from the planer and delivered to the side gluer who applies the sides of the case, which have been previously finished to dimensions in the case plant. Since the width of the frame is fixed absolutely by the planer, and the lateral edges are exactly parallel and perpendicular to the upper edge, the distance between the sides at every point is predetermined and is exactly the same at the top and bottom. This greatly facilitates subsequent operations, since the key bottom, bottom frame, toe rail and pedal trap action may be introduced and fastened in place without fitting of any kind. The key bottom is inserted below the cheeks of the piano. A template fits between the cheeks above the key bottom to fix the distance between the cheeks to which the key bottom is fastened. The key bottom is also secured to brackets on the string plate.

The piano is next provided with ball bolts to support the action brackets, and, in positioning the bolts, a template is used which gauges the distance of the bolts from the front edge of the key bottom and from the right-hand side of the piano. The bolts are screwed into the key bottom and are gauged with a height gauge to project therefrom a predetermined distance. The top bolts are set with reference to the ball bolts, using a template, made of action brackets, which are milled and bored to predetermined measurements and connected by dummy rails. The top bolts are set with their heads at a predetermined distance from the string plate to the top of the action brackets. The action brackets are then mounted on the ball bolts and are secured to the frame by the top bolts, the positions of which are accurately determined from the face of the plate and the right hand side of the case. Thus, the brackets are positioned to support the action in predetermined relation to the strings, which occupy a definite relation to the sides of the piano and the bridges on the sounding board.

The action and its various parts may be manufactured in the same factory, although customarily, the action is received complete by the piano manufacturer with the exception of the hammers and dampers. The assembled action is mounted in a dummy piano for convenience in mounting the hammers and dampers, which are fastened in place, the hammer shanks and damper stems being of predetermined length to permit the hammers to engage the strings at the proper striking line. The action, when complete, is removed from the dummy, and held in readiness for mounting in any piano which is under construction.

When the case has been completed to the point previously indicated, the finished action is mounted in the brackets. The required number of keys is assembled, and, since all dimensions have been properly maintained throughout the construction, the keys require no marking for the capstan screws. The keys are therefore drilled previously and provided with capstan screws, which are inserted at a fixed distance from the front ends before the keys are assembled on the key bed. The capstan screws register with the abstracts in the action without individual application of the screws as has been necessary heretofore. Consequently, the drilling and insertion of the screws may be accomplished with automatic machinery, insuring accuracy and lower cost. It is to be particularly noted that no bending of the hammer shanks or damper stems is necessary when the action is adjusted, since these members are in exact alignment with the strings and are adapted to strike on the true striking line of the piano, because the relation of all of these parts has been predetermined and maintained throughout the construction. Thus, a tedious and costly operation of piano construction is entirely eliminated.

The piano is now substantially complete and is sent to the finishing department where the key blocks, name rail, shelf, top frame, top and key rail and all hinges are mounted. All these case parts are finished to snap gauge measurements in the case plant and as delivered to the assemblers, require no fitting of any sort. The ends of all pieces may be varnished in the case plant, thus further decreasing the work of the finisher. After the parts are mounted, the piano is tone-regulated and tuned and the case is rubbed with pumice and polished with rotten stone and water to bring out the high polish. The case is then oiled off and any pin holes in the coating are burnt in with hard shellac. The piano is then subjected to final tuning and is ready for shipment.

In order that the invention may be more readily understood, a piano in its several stages of construction has been illustrated in the accompanying drawing, but it should be understood that the invention is not limited to any particular style or type of piano, and that the invention is therefore broadly claimed as applied generally to the construction of pianos. In the drawing:

Fig. 1 is a vertical transverse section through a piano constructed in accordance with the invention.

Fig. 2 is an elevation of the piano frame or back.

Fig. 3 is a section on the line 3—3 of Fig. 2.

Fig. 4 is a view in section, illustrating the piano back with the gauge and milling machine employed in finishing the lower edge of the wrest plank or pin block.

Fig. 5 is a detail in perspective of the gauge for guiding the milling machine.

Fig. 6 is a plan view of the face of the sounding board.

Fig. 7 is a section on the line 7—7 of Fig. 6.

Fig. 8 represents the template employed in fixing the bridges on the sounding board.

Fig. 9 is a section on the line 9—9 of Fig. 8.

Fig. 10 is an elevation illustrating the sounding board assembled with the frame or back.

Fig. 11 is a section on the line 11—11 of Fig. 10.

Fig. 12 is a detail illustrating the method of fixing the position of the metal plate on the frame or back of the piano.

Fig. 13 is a section on the line 13—13 of Fig. 12.

Fig. 14 is a section on the line 14—14 of Fig. 12.

Fig. 15 is a detail in perspective of the gauge employed in fixing the position of the metal plate.

Fig. 16 is a plan view of the metal plate assembled with the back or frame and sounding board of the piano.

Fig. 17 is a plan view of a template for fixing the position of the pins of the wooden bridges.

Fig. 18 is a section on the line 18—18 of Fig. 16.

Fig. 19 is an elevation, partially in section, of a planing machine employed in finishing the frame or back of the piano.

Fig. 20 is a front elevation of the machine.

Fig. 21 is a detail in elevation indicating the gauge on the planing machine.

Fig. 22 is a detail in elevation of the plate, indicating the method of stringing the piano.

Fig. 23 is a detail in perspective of a gauge employed in spacing the strings.

Fig. 24 is a diagrammatical illustration of a piano case indicating the manner in which the sides are applied to the frame or back.

Fig. 25 is a view in perspective of the gauge employed in fixing the relation of the sides at the cheeks.

Fig. 26 is a detail in section, illustrating the assembly of the key bottom and keys in the piano.

The detailed operations of constructing and assembling a piano in accordance with the present invention involve, as stated heretofore, the continued application of gauges or other devices adapted to insure exact measurements, and particularly a predetermined relation between the strings and bridges and the sides of the piano, and particularly the relation of the supports for the action to the strings, in order that the hammers may strike fairly at predetermined points on the strings. In constructing a piano, therefore, a frame is built, consisting of upright posts 5, rabbeted at the top and bottom to receive horizontal top members 6 and 6' and bottom members 7, respectively, with intermediate blocks 7' between the posts; the frame being of rigid construction, securely fastened to provide the necessary strength. Supports 10' for the sounding board are secured to the frame. The upper edge 8 of the frame is finished to a straight line and the two ends are approximately perpendicular thereto. A wrest plank or pin block 9, which is built up of suitable veneer, is secured to the frame with its upper edge flush with the edge 8. The frame is then mounted on a table 10, and an angular gauge 11 is arranged thereon and secured by a clamp 12 to indicate the desired position of the lower edge of the wrest plank, which must be exactly parallel with the upper edge thereof and of the frame. The gauge is provided with a slot, having an edge 13, which serves as a guide for a roller 14 on the shaft of a milling machine, preferably driven by an electric motor 15. A milling cutter 16 is arranged on the shaft below the roller, and, when the milling machine is moved along the gauge with the roller in contact with the edge 13, the rotating milling cutter finishes the edge of the wrest plank in exact parallelism with the upper edge of the frame and at a predetermined distance, $a$, therefrom.

Meanwhile, a sounding board, 17, is prepared and supported in a suitable template similar to that hereinafter described in connection with the fixing of the bridges. The upper edge of the sounding board is first finished with a straight line and the board is then fixed in the template with its upper and right-hand edges engaging suitable gauges thereon. The template fixes the place of the ribs 18 on the back of the sounding board, which are glued thereto under suitable pressure. When the glue has hardened, the sounding board is removed, and the ends of the ribs 18, adjacent the edges thereof, are cut away to facilitate assembling of the sounding board with the frame of the piano. Before mounting the sounding board on the frame, it is supported in a template 19 with its upper and right-hand edges engaging suitable gauges thereon. Gauges 20 are then brought down upon the face of the sounding board to fix the position of the treble and bass wooden bridges 21 and 22, which are glued to the face of the sounding board under suitable pressure. The sounding board, when the glue is dry, is assembled with the frame by bringing the upper edge into engagement with the shoulder 23 of the wrest plank, which was formed as indicated, by the milling machine and by adjusting the right-hand edge of the sounding board, until it coincides with the right-hand edge of the frame. Thus, the wooden bridges on the sounding board bear an exact relation at every point to the upper and right-hand edges of the frame. The sounding board is secured in place by screws 24, which engage the upright members 5 of the frame.

A metal plate 25 is provided with a rib 26 at its rear face, the upper edge of which is machined accurately to a straight line a predetermined distance from the iron bridges on the face of the plate, and the plate is next assembled with the frame, by laying it upon the sounding board with the straight edge of the rib 26 in engagement with the shoulder 23 of the wrest plank. The lateral position of the plate with reference to the edge of the frame is fixed by a gauge 27, having a depending arm 28 adapted to coöperate with the edge of the frame, and a pin 29, which is adapted to enter the hole provided for the middle pin for the last treble strings. Thus, the position of the treble and bass bridges 30 and 31 on the metal plate are fixed relatively to the upper and right-hand edges of the frame, and, consequently, bear a predetermined relation to the wooden bridges on the sounding board. The string bearing on the wooden bridges is next determined by the saw gauge, and the metal frame is then removed. The wooden bridges are planed to the string bearing height as determined by the saw gauge and painted with black lead for marking. A template 32, having a plurality of openings 33, is employed in fixing the pins on the wooden bridge. The template 32 rests with its upper edge against the shoulder 23 of the wrest plank and is provided with a depending lug 32' adapted to abut the right-hand edge of the frame.

When the pins have been inserted in the wooden bridge, 21, the metal plate is mounted on and fastened by suitable bolts to the piano frame, and the piano is strung in the manner indicated in Fig. 22. When the stringing is complete, a gauge 34 is employed to determine the relative positions of the middle string of each set on the metal bridges 30, and a chipping tool 35, having triple slots 36, is employed to fit the relative positions of the strings of each set, the operation being termed "chipping," and including the preliminary tuning of the instrument. The frame and plate are thus complete except for the fact that the ends of the frame are not exactly perpendicular to the top; it being practically impossible to secure parallelism of these edges by the use of ordinary hand tools. Since it is a fundamental requirement to the successful manufacture of pianos in accordance with the invention that the sides of the frame be exactly perpendicular to the upper edge and parallel to each other, means are provided to insure this result. The means include a special planing machine adapted to receive the frame after the plate and strings have been applied thereto, and to plane the edges of the frame without disturbing the position of the bridges and strings with respect to these edges.

The machine is illustrated in Figs. 19–21 of the drawings and, briefly, comprises a rigid support 37, carrying a movable bed 38, which is adapted to be advanced through the operation of certain mechanism provided for this purpose and driven from a source of power. Such mechanism is common to planing machines and need not be described in detail therefore, herein. Upon the bed 38, a straight edge 39 is provided, which preferably carries adjustable points 40, adapted to grip the piano frame when its upper edge is disposed against the straight edge 39. On the opposite end of the bed, an adjustable clamp 41 is adapted to engage the bottom edge of the frame and to hold the frame securely on the bed. Rotatable cutters 42 are supported on shafts 43 at the opposite sides of the support 37 and are adapted to be rotated through suitable connections, preferably belts 44 engaging pulleys 45 and with driving pulleys actuating from a suitable source of power.

In adjusting the position of the piano frame upon the bed 38, it is necessary to insure that the relation of the strings to the sides of the frame is not destroyed in planing. Consequently, a gauge 45 is adjustably mounted on a depending support 46, which is in turn adjustable on a cross-bar 47, so that the planing machine may be adapted to the production of pianos of different sizes. The gauge preferably has the form of a hammer 48, which, when lowered, is intended to engage the middle string of the set which sounds the last treble note of the scale, as indicated in Fig. 21. When the gauge is properly set, the frame resting on the bed is shifted laterally until the hammer properly cooperates with the string indicated; whereupon the frame is clamped on the bed and the hammer is lifted.

Power is then applied to advance the bed 38 and rotate the cutters 42, which plane the lateral edges of the frame to exact parallelism and perpendicularity to the upper edge. The bed advances at a uniform rate until the edges have passed the cutters and then returns at an increased speed, preferably double that of its advance. As it travels thus in the same direction as that of rotation of the cutters, the edges are grooved or provided with shallow corrugations which furnish a splendid gluing surface and insure rigid fastening of the sides of the piano to the frame.

The frame is now transferred to the sidegluer, who applies the sides 49 to the ends of the frame. The sides are previously constructed in the case plant to exact dimensions using snap gauges wherever applicable to insure absolute accuracy of the parts. The sides are varnished before they are delivered for assembly with the frame. In applying the sides to the frame, a gauge 50 is employed, against which the sides are clamped so that the distance $c$, (Fig. 24) is exactly the predetermined length of the key bottom 51, and also of such a length that the sides squarely fit the frame as finished in the planing machine. The key bottom 51 is next inserted and secured in place together with a bottom frame 52, the toe rail and pedal trap action, and the piano is ready to receive the action.

The action, indicated generally in Fig. 1 at 56, is preferably fitted in a dummy piano, as previously described, with hammers and dampers, and is ready for mounting in the piano. To support the action, ball bolts 57 are driven in the key bottom 51 at a predetermined distance from the front edge thereof and in fixed relation to the sides of the piano, a template being employed for this purpose. Thus, the action and every element thereof, when mounted on the ball bolts, will bear a fixed relation to the sides of the piano, which, as previously indicated, bear a similar relation to the strings. A template consisting of action brackets 58, connected by dummy rails, is supported on the ball bolts 57 and bolts 59 are driven in the frame of the piano and adjusted until machined faces of the rail supports on the brackets are at a predetermined distance from the face of the string plate. The brackets and the action 56 are then mounted and secured on the frame and the keys 60 are assembled on the key bottom. Since the position of the action and consequently of the abstracts 61 is predetermined, it is unnecessary to specially mark and drill the keys to receive the capstan screws 62; and the latter are inserted preferably by automatic machinery in the keys before the latter are assembled. The capstan screws engage the abstracts and are adjusted vertically to permit the hammers 63 to rest against the rail 64, while the ends of the keys are disposed in a plane at the front of the piano. The piano then passes to the fly finishing department where a top frame 65, top 66, shelf 67 and falls 68, as well as the minor details of the case are applied, and the piano is ready for finishing and final tuning.

Throughout the construction, from the frame to the finished piano, numerous operations, heretofore considered essential, are eliminated and others are expedited, so that the time required to build the piano complete is materially decreased. Furthermore, the instrument, when completed, is entirely free from the common defects of pianos which result from variations introduced during manufacture. Each piano of any particular type is identical with every other produced in the same plant from the same plans. The elimination of distortion of the hammer shanks and damper stems is to be particularly noted, since this is a fruitful source of trouble in pianos as heretofore constructed.

The discovery that pianos, though constructed largely of wood, may be accurately fashioned to exact dimensions and assembled from parts previously cut and finished to fit without further cutting by means of hand tools, is of the highest importance in this art. The elimination of hand tools which have been the cause, heretofore, of much inferiority in pianos, is, in fact, one of the primary features of the invention. This, with the application of the principle of following exact dimensions and predetermination of the relative position of the parts, and particularly the position of the bridges and strings with reference to the lower edge of the pin block and the side of the piano, insures the successful construction of pianos of uniform quality. The respective parts of pianos constructed in accordance with the invention are interchangeable throughout, and repairs may consequently be readily made without returning the piano to the factory. Careless workmanship is, of course, immediately detected because, if variations are introduced, the piano cannot be assembled. The elimination of most of the hand work materially aids in the production of an instrument of standard quality.

Obviously, various changes may be made in the details of the several operations within the scope of the accompanying claims without departing from the invention or sacrificing any of its advantages.

I claim:

1. The improvement in the art of manufacturing pianos, which comprises assembling the frame, sounding board and plate of a piano with the bridges and strings thereon in predetermined and exact relation with each other and with the striking point of a selected hammer of the piano action.

2. The improvement in the art of manufacturing pianos, which comprises assembling the frame, sounding board and plate of a piano with the bridges and strings thereon in predetermined and exact relation with each other and with the striking point of a selected hammer of the piano action, and thereafter planing the lateral edges to exact perpendicularity with the upper edge.

3. The improvement in the art of manufacturing pianos, which comprises assembling the frame, sounding board and plate of a piano with the bridges and strings thereon in predetermined and exact relation with each other and with the upper edge of the frame, and thereafter planing the lateral edges to exact perpendicularity with the upper edge, the planing being gauged from a given string, whereby the relation of the strings and bridges to the lateral edges is fixed.

4. The improvement in the art of manufacturing pianos, which comprises assembling the frame, sounding board and plate of a piano with the bridges and strings thereon in predetermined and exact relation with each other and with the upper edge of the frame, and thereafter planing the lateral edges to exact perpendicularity with the upper edge, the planing being gauged from a given string, whereby the relation of the strings and bridges to the lateral edges is fixed, preparing the case parts independently with predetermined dimensions adapted for assembling with the frame and assembling the case parts on the frame.

5. The improvement in the art of manufacturing pianos, which comprises assembling the frame, sounding board and plate of a piano with the bridges and strings thereon in predetermined and exact relation with each other and with the upper edge of the frame, and thereafter planing the lateral edges to exact perpendicularity with the upper edge, the planing being gauged from a given string, whereby the relation of the strings and bridges to the lateral edges is fixed, preparing the case parts independently with predetermined dimensions adapted for assembly with the frame, assembling the case parts on the frame and mounting the action in predetermined relation to the sides of the piano and the strings.

6. The improvement in the art of manufacturing pianos, which comprises constructing a frame with the wrest plank thereon, finishing the lower edge of the wrest plank to exact parallelism with the upper edge of the frame and at a fixed distance therefrom, and finishing the lateral edges of the frame exactly perpendicular to the upper edge of the frame, and in exact relation to the striking point of a selected hammer of the piano action.

7. The improvement in the art of manufacturing pianos, which comprises constructing a frame with the wrest plank thereon, finishing the lower edge of the wrest plank to exact parallelism with the upper edge of the frame and at a fixed distance therefrom, applying the sounding board, string plate and the strings to the frame, and finishing the lateral edges of the frame and sounding board exactly perpendicular to the upper edge of the frame and in exact relation to the striking point of a selected hammer of the piano action.

8. The improvement in the art of manufacturing pianos, which comprises constructing a frame with the wrest plank thereon, finishing the lower edge of the wrest plank to exact parallelism with the upper edge of the frame, and at a fixed distance therefrom, applying the sounding board, string plate and the strings to the frame, finishing the lateral edges of the frame and sounding board exactly perpendicular to the upper edge of the frame and in exact relation to the striking point of a selected hammer of the piano action, and exactly fixing the supports for the action on the frame with reference to the lateral edges of the frame.

9. The improvement in the art of manufacturing pianos, which comprises, constructing a frame with the wrest plank thereon, finishing the lower edge of the wrest plank to exact parallelism with the upper edge of the frame and at a fixed distance therefrom, applying the sounding board, string plate and the strings to the frame, finishing the lateral edges of the frame and sounding board exactly perpendicular to the upper edge of the frame and in exact relation to the striking point of a selected hammer of the piano action, exactly fixing the supports for the action on the frame with reference to the lateral edges thereof and mounting the action as a unit upon the supports provided therefor thereby bringing the selected hammer into exact cooperative relationship with its striking point.

10. The improvement in the art of manufacturing pianos, which comprises, constructing a frame with the wrest plank to exact parallelism with the upper edge of the frame and at a fixed distance therefrom, applying the sounding board, string plate and the strings to the frame, finishing the lateral edges exactly perpendicular to the upper edge of the frame and in exact relation to the striking point of a selected hammer of the piano action, separately assembling the piano action in a dummy frame of standard dimensions and mounting the assembled action as a unit upon the supports provided therefor in predetermined relation to the lateral edges of the frame.

11. The improvement in the art of manufacturing pianos, which comprises, assembling the action with the hammers and dampers with reference to fixed and predetermined striking points and subsequently mounting the action as a unit in the frame of the piano in predetermined and exact relation to the lateral edges of the frame.

12. The improvement in the art of manufacturing pianos, which comprises, assembling the action with the hammers and dampers in a dummy frame and thereafter mounting the action as a unit in the frame of the piano in predetermined and exact relation to the lateral edges of the frame.

13. The improvement in the art of manufacturing pianos, which comprises, constructing the frame of a piano of standard and exact dimensions, independently assembling the action with reference to fixed and predetermined striking points and subsequently mounting the action as a unit in the frame in predetermined and exact relation to the lateral edges thereof.

14. The improvement in the art of manufacturing pianos, which comprises, constructing a frame of a piano of predetermined and exact dimensions, fixing the supports for the piano action in exact relation to the lateral edges of the frame, separately assembling the action with reference to predetermined striking points, and subsequently mounting the action as a unit in the frame.

15. The improvement in the art of manufacturing pianos, which comprises constructing and stringing a frame, planing the lateral edges to exact perpendicularity to the upper edge and in definite relation to the striking point of a selected hammer of the action, separately assembling the action with reference to predetermined striking points, and subsequently mounting the action as a unit on the frame.

16. The improvement in the art of manufacturing pianos, which comprises constructing a frame with the wrest plank thereon, finishing the lower edge of the wrest plank to exact parallelism with the upper edge of the frame, finishing the edge of a rib on the back of the string plate in exact relation with the bridges thereon, and mounting the string plate on the frame with the finished edge of the rib abutting the lower edge of the wrest plank.

17. The improvement in the art of manufacturing pianos, which comprises constructing a frame with the wrest plank thereon, finishing the lower edge of the wrest plank to exact parallelism with the upper edge of the frame, finishing the edge of a rib on the back of the string plate in exact relation with the bridges thereon, mounting the string plate on the frame with the finished edge of the rib abutting the lower edge of the wrest plank, and fixing the position of the string plate on the frame with reference to the lateral edges thereof.

18. The improvement in the art of manufacturing pianos, which comprises constructing a frame with the wrest plank thereon, finishing the lower edge of the wrest plank to exact parallelism with the upper edge of the frame, finishing the edge of a rib on the back of the string plate in exact relation with the bridges there, mounting the string plate on the frame with the finished edge of the rib abutting the lower edge of the wrest plank, fixing the position of the string plate on the frame with reference to the lateral edges thereof, and thereafter planing the lateral edges of the frame to exact perpendicularity to the upper edge thereof.

19. The method of making a piano, which consists in building a frame, planing opposite side edges of the frame simultaneously so that they will be in exact parallelism and at a predetermined distance apart, and building up the piano by applying sides and other parts to the frame, whereby parts drawn from stock may be employed without special fitting of each part.

20. The method of making a piano, which consists in building a frame having its lateral edges in exact parallelism and at a predetermined distance apart, and building up the piano thereon by applying sides and other case parts to the frame, whereby case parts drawn from stocks of duplicate parts may be employed without special fitting of each part.

21. The method of making a piano, which consists in building a frame, mounting thereon a sounding board and plate, shaping the lateral edges of the frame simultaneously to bring them to exact parallelism with each at a predetermined distance from a predetermined point on the plate, and building up the piano by applying sides and other case parts, etc.

22. The improvement in the art of manufacturing pianos, which comprises constructing a frame with the wrest plank thereon and with the upper edge in exact parallelism with the lower edge of the wrest plank at a fixed distance therefrom and finishing the lateral edges of the frame exactly perpendicular to the upper edge of the frame and in exact relation to the striking point of a selected hammer of a piano action.

23. The improvement in the art of manufacturing pianos, which comprises constructing a frame with the wrest plank thereon and with the upper edge in exact parallelism with the lower edge of the wrest plank at a fixed distance therefrom, applying the sounding board, string plate and strings to the frame, and finishing the lateral edges of the frame exactly perpendicular to the upper edge of the frame and in exact relation to the striking point of a selected hammer of the piano action.

24. The improvement in the art of manufacturing pianos, which comprises constructing a frame with the wrest plank thereon and with the upper edge of the frame in exact parallelism with the lower edge of the wrest plank at a fixed distance therefrom, finishing the edge of a rib on the back of the string plate in exact relation with the bridges thereon, and mounting the string plate on the frame with the finished edge of the rib abutting the lower edge of the wrest plank.

In testimony whereof I affix my signature.

FRANK G. ERNST.